Nov. 29, 1966  P. FORD ETAL  3,287,767
INJECTION MOULD
Filed Feb. 4, 1965
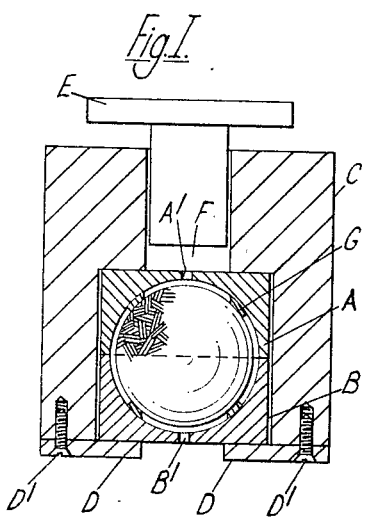
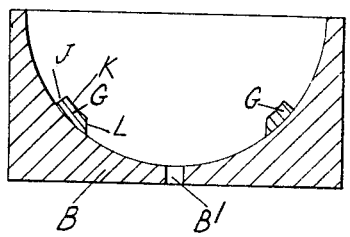
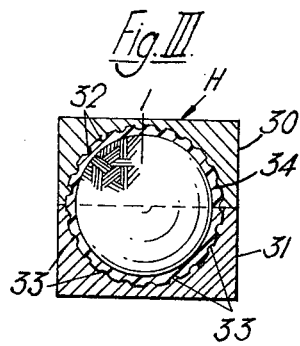
INVENTORS
PETER FORD
JOHN WILLIAM WATSON
ROGER JAMES OTTEWELL
BY Bacon & Thomas
ATTORNEYS 3,287,767
INJECTION MOULD
Peter Ford, John William Watson, and Roger James Ottewell, all of Erdington, Birmingham, England, assignors to Dunlop Rubber Company Limited, Erdington, England, a British company
Filed Feb. 4, 1965, Ser. No. 430,292
Claims priority, application Great Britain, May 23, 1960, 18,129/60; May 17, 1961, 18,129/60
5 Claims. (Cl. 18—30)

This invention is concerned with an injection mould suitable for use in the manufacture of golf balls, and is a continuation-in-part of our United States patent application Serial Number 112,007 filed May 23, 1961, now issued on April 6, 1965, as U.S. Patent No. 3,177,280.

In said United States application there is described a process for the manufacture of balls, particularly golf balls, which comprises supporting a preformed ball core (for example of vulcanized rubber thread or of polyurethane thread); forming an integral, unpatterned, solid cover thereon by applying to said core a viscous liquid curable polyurethane pre-polymer, and partially curing said polyurethane until the cover is solid but still substantially thermoplastic; cooling said cover to a temperature at which further curing of the polyurethane is inhibited; transferring said partially cured coated core to a ball mould provided with a patterned moulding surface and moulding the coated core to a pattern ball therein while simultaneously further curing the polyurethane to a substantially non-thermoplastic state.

The present invention is concerned with an injection mould suitable for forming the integral, unpatterned, solid cover on the golf ball core in said process.

It is an object of the present invention to provide an injection mould usable in a process for forming the cover on golf ball cores during a process for the manufacture of golf balls.

It is also an object of the present invention to provide an injection mould capable of accurately centering a thread wound golf ball core, which may be thinly pre-coated, so that a thin cover of unvarying thickness may be applied to said core.

The present invention therefore provides an injection mould for use in a process of covering golf ball cores and having a plurality of mating die plates held in assembly, the inner surfaces of which define a spheroid, from 3 to 12 inwardly protruding wedge-shaped support members symmetrically disposed on said inner surfaces to permit a golf ball core to be centrally supported on said support members at a predetermined distance from said inner surfaces, thus defining a moulding zone, an injection orifice and a spew hole in said die plates, and means to force moulding material through said injection orifice into said moulding zone.

Generally only two mating die plates, the inner surfaces of which each define a hemisphere are necessary or desirable. It is not sufficient for the lower of the two die plates to have all the support members since there is then a likelihood of the core lifting or moving sideways during the injection step. The core must be incapable of movement when centered on the wedge-shaped supports even when the mould is inverted. It has been found that where two mating die plates are used, then three support members symmetrically disposed over the inner surface of each die plate give accurate centering of the core in the mould.

Furthermore when more than 12 support members are used, the chance of flaws occurring in a final patterned ball is considerably increased.

With a view to avoiding subsequent flaws in a golf ball produce, after the final moulding step in a patterned golf ball mould, both the total number and also the individual size of the wedge-shaped support members should be as small as possible consistent with centering the core in the mould. If the number of supports is excessive, indentations from said supports will appear in the final patterned golf ball.

The mating die plates are conveniently held in assembly by a sleeve, and the means to force moulding material through the injection orifice may then be a plunger arranged to slide in said sleeve and to force moulding material through the injection orifice into said moulding zone.

The use of wedge-shaped support members to centrally position the ball-core in the mould facilitates extraction of a coated ball core from the mould. The end faces of each wedge-shaped support member should be either vertical or inclined towards each other, and in any case never inclined sharply away from each other. The length of the edge of each wedge-shaped support member may be from 2 mm. to 6.5 mm. with a view to bridging the gap between adjacent thread windings on a thread wound core. The edges need not be knife-edges but can conveniently be flat-edged to give more support to the core in the mould.

There will now be described, by way of example only, a form of injection mould according to the invention. Referring to the accompanying diagrammatic drawings:

FIG. I shows an injection mould assembly, in section, in accordance with the present invention;

FIG. II shows the lower half of the mould of FIG. I on an enlarged scale to show the structure of the wedge-shaped supports;

FIG. III is a sectional view through a conventional compression type of golf ball mould suitable for performing the final patterning step in the production of a golf ball.

In FIG. I, the injection mould assembly comprises two mating die plate halves A and B defining internally a spheroid when assembled as shown inserted in a sleeve C. A, B and C are retained in position by annular plate D on the underside of C by means of threaded pins D'. The mould assembly is provided with a plunger E. Each half of the mould has secured thereto three or more symmetrically disposed wedge-shaped supports G each having a core supporting edge K, as shown on an enlarged scale in FIG. II, in order to locate the core centrally in the mould. Care is taken to ensure that the end faces of the wedges are shaped to allow ready withdrawal of the coated core from the mould i.e. the inner end faces L are either vertical or point inward to the mould and the outer end faces J are either vertical or point outward from the mould. Finally, the upper half A of the mould is provided with an injection orifice A' to permit transfer of polyurethane prepolymers into the mould, while the lower half B of the mould is provided with a spew hole B'.

In FIGURE III is shown a conventional compression type golf ball mould for applying the desired pattern to the partially cured coated core.

The coated core I is placed in the mould H having mating halves 30 and 31. The inner surfaces of each of the mating halves 30 and 31 have a plurality of projections shown as 32 and 33 respectively which imprint the desired pattern on the partially cured coating 34 on the coated ball core I.

When using the injection mould of the invention to manufacture golf balls a previously prepared golf ball core is positioned in the mould provided with said supports and curable polyurethane is moulded around the core, by injection moulding, curing of the polyurethane is interrupted and the covered core is transferred to a patterned golf ball mould wherein moulding and curing are completed. A thin precoating of rubber latex may be applied to the core before positioning it in the mould by dipping the core in rubber latex in order to ensure that no unwinding of the thread wound core occurs.

Whether or not the thread wound core is thinly precoated in this way the area of each support member in contact with the core should be such as to prevent the support member penetrating between two thread windings.

For the further understanding of the invention the following example is given by way of illustration only:

*Example*

A golf ball core was immersed for 5 minutes in 60% natural rubber latex, drained and dried in a current of warm air. It was then placed in the cavity between the two injection mould halves A and B (FIG. I) which were then inserted in the sleeve C, and the plate D screwed in position. All parts of the mould assembly were at 100° C.

Titanium dioxide (anatase) was dried at 140° C. for 1 hour. After drying, the titanium dioxide was allowed to cool to room temperature in a closed container. The titanium dioxide was then mixed with twice its weight of p,p'-methylene bis (orthochloroaniline) (MOCA), also known as 3,3' - dichloro - 4,4' - diamino - diphenylmethane, as a cross-linking agent, and the mixture ball-milled for 24 hours to break down aggregates of titanium dioxide. The mixture of MOCA/titanium dioxide was transferred to a vessel which was then evacuated and heated, e.g. on an oil bath, to 140° C. The MOCA melted and dissolved gas was removed. The vacuum was released and the mixture stored in an oven at 110° C. in a sealed container. Immediately prior to use, the mixture was vigorously agitated to re-disperse the titanium dioxide in the liquid MOCA.

30 parts of the prepared MOCA/titanium dioxide mixture at 110° C. were added to 100 parts of a commercial liquid polyurethane pre-polymer obtained from polytetrahydrofuran and tolylene diisocyanate, believed to be tolylene-2,4-diisocyanate, the pre-polymer being at room temperature and the mixture stirred vigorously. Exposure of the polyurethane pre-polymer to the atmosphere was kept to a minimum to avoid reaction with atmospheric moisture. The mixture was kept under vacuum for two minutes to eliminate dissolved gas.

To minimize pre-curing of the compounded syrup it was used as soon as possible, e.g. within 7 minutes of adding the MOCA to the polyurethane pre-polymer.

The degassed syrup was poured into the transfer cavity F of the mould of FIG. I and the plunger E, inserted. The mould was then inverted, and allowed to close under its own weight. The syrup surrounded the core and began to flow out of the spew hole B' at the top into the hole in the plate D, when the mould assembly had closed, it was placed in an oven at 110° C., for 6.5 minutes. The mould assembly was then cooled with water to about 10° C., and the mould removed from the assembly and opened. The preformed ball, from which "sprues" had been removed, was then given a final press cure of 10 minutes at 100° C., in the conventional golf ball mould of FIG. III which imprinted the lettering and pattern. The complete ball showed no signs of support marks or excrescences. Tests showed it to have superior cutting resistance to that of a standard gutta percha-covered ball. The ball was sectioned and it was found that the polyurethane coating was of uniform thickness and had excellent adhesion to the core.

The covered core may be converted into a golf ball by placing it in a patterned golf ball mould, e.g. of the compression type, where curing of the polyurethane is advanced to a non-thermoplastic state and the desired pattern is imparted to the cover. The time of cure will depend on the nature of the polyurethane and the temperature of cure but the conditions appropriate in any given case can readily be determined by simple experiment. The temperature should not be so high that the core is damaged.

It is desirable to store the finally moulded ball e.g. by standing at room temperature for three days, to allow the cover to develop its full strength and hardness.

We claim:

1. An injection mould for use in a process of covering golf ball cores and having a plurality of mating die plates held in assembly, the inner surfaces of which define a spheroid, from 3 to 12 inwardly protruding wedge-shaped support members symmetrically disposed on said inner surfaces to permit a golf ball core to be centrally supported on said support members at a predetermined distance from said inner surfaces, thus defining a moulding zone of unvarying thickness, the end faces of said wedges being shaped to allow ready withdrawal of the coated core from the mould, each wedge having planar inner and outer end faces, the inner end face of each wedge disposed so as to be in a direction between parallel to the direction of removal of the coated core and a direction diverging outwardly from said spherical mould surface, the outer end face of each wedge disposed so as to be in a direction between parallel to the direction of removal of the coated core and a direction converging outwardly from said spherical mould surface, means defining an injection orifice and means defining a spew hole in said die plates, and means to force moulding material through said injection orifice into said moulding zone.

2. An injection mould as claimed in claim 1 having two mating die plates each provided with three secured, symmetrically disposed support members which centrally and immovably locate said golf ball core without penetration thereof.

3. An injection mould as claimed in claim 1 having two mating die plates and a sleeve to hold the die plates in assembly, said die plates each being provided with three symmetrically disposed support members.

4. An injection-mould as claimed in claim 1 wherein said wedge-shaped support members have flat edges having a length of from 2–6.5 mm.

5. An injection mould for use in a process of covering golf ball cores and having a plurality of mating die plates held in assembly, the inner surfaces of which define a spheroid, from 3 to 12 inwardly protruding wedge-shaped support members symmetrically disposed on said inner surfaces to permit a spheroid golf ball core to be centrally supported on said support members at a predetermined distance from said inner surfaces, and thus define a moulding zone, the end faces of said wedges being shaped to allow ready withdrawal of the coated core from the mould, each wedge having planar inner and outer end faces, the inner end face of each wedge disposed so as to be in a direction between parallel to the direction of removal of the coated core and a direction diverging outwardly from said spherical mould surface, the outer end face of each wedge disposed so as to be in a direction between parallel to the direction of removal of the coated core and a direction converging outwardly from said spherical mould surface, means defining an injection orifice and means defining a spew hole in said die plates, and means to force moulding material through said injection orifice into said moulding zone whereby, when said moulding material is forced into said moulding zone and solidified, a coated golf ball core is obtained which, after pressing in a conventional patterned golf ball mould, shows no signs of indentations from said supports.

References Cited by the Examiner

UNITED STATES PATENTS

| | | | |
|---|---|---|---|
| 259,984 | 6/1882 | Hyatt et al. | 18—36 X |
| 1,270,008 | 6/1918 | Cobb | 249—142 X |
| 2,017,216 | 10/1935 | Marcus | 18—42 |
| 2,178,774 | 11/1939 | Bogowlowsky. | |
| 2,209,413 | 7/1940 | Marinsky | 18—42 |
| 2,361,348 | 10/1944 | Dickson et al. | 18—36 X |
| 2,962,761 | 12/1960 | Hobson. | |
| 3,109,202 | 11/1963 | Beckadolph | 18—36 |
| 3,141,914 | 7/1964 | Morin | 264—275 |
| 3,147,324 | 9/1964 | Ward | 18—36 X |
| 3,177,280 | 4/1965 | Ford et al. | 264—275 |

J. SPENCER OVERHOLSER, *Primary Examiner.*

ALEXANDER H. BRODMERKEL,
J. HOWARD FLINT, JR., *Examiners.*

F. MARLOWE, *Assistant Examiner.*